(12) United States Patent
Huibers et al.

(10) Patent No.: US 7,042,623 B1
(45) Date of Patent: May 9, 2006

(54) LIGHT BLOCKING LAYERS IN MEMS PACKAGES

(75) Inventors: Andrew Huibers, Palo Alto, CA (US); Satyadev Patel, Sunnyvale, CA (US); Terry Tarn, San Diego, CA (US)

(73) Assignee: Reflectivity, INC, Sunnyvale, CA (US)

( * ) Notice: Subject to any disclaimer, the term of this patent is extended or adjusted under 35 U.S.C. 154(b) by 4 days.

(21) Appl. No.: 10/969,258

(22) Filed: Oct. 19, 2004

(51) Int. Cl.
*G02B 26/00* (2006.01)
(52) U.S. Cl. .................................................. 359/291
(58) Field of Classification Search ............... 359/290, 359/291, 292, 295, 298, 223, 224, 322, 323
See application file for complete search history.

(56) References Cited

U.S. PATENT DOCUMENTS 6,624,921 B1 * 9/2003 Glenn et al. ................. 359/291
6,844,959 B1 * 1/2005 Huibers et al. .............. 359/297

* cited by examiner

*Primary Examiner*—Hung Xuan Dang
*Assistant Examiner*—Tuyen Tra
(74) *Attorney, Agent, or Firm*—Gregory R. Muir (57) ABSTRACT

Disclosed herein is a micromirror array device package having a light absorbing material disposed within the package for reducing undesired light scattering. The light absorbing material can be deposited as a thin film (or strip, frame, segments or a combination thereof), or as a vertical wall insert between the micromirror array device and a cover substrate of the package.

52 Claims, 5 Drawing Sheets

LIGHT BLOCKING LAYERS IN MEMS PACKAGES

TECHNICAL FIELD OF THE INVENTION

The present invention is generally related to the art of light emitting, modulating, or detecting electronic devices, and more particularly, to microelectromechanical devices (MEMS) and the art of packaging said devices.

BACKGROUND OF THE INVENTION

Projection display systems employing spatial light modulators, as well as many other image-producing systems, require only information carrying light be projected on the viewing screens so as to obtain desired images of acceptable qualities. Undesired light, especially scattered light from the components of the projection system, if mixed with the information carrying light and projected on the viewing screen will degrade the desired image quality. In particular, undesired scattered light may decrease the contrast ratio.

Contrast ratio is the ratio of luminance between the brightest white that can be produced and the darkest black that can be produced. If a display image has a higher contrast ratio, a viewer will judge it to be sharper than a displayed image with a lower contrast ratio, even if the lower contrast image has substantially more measurable resolution. Contrast ratio can be seriously degraded by light scattered, for example, from the cell glass of the micromirror device and the package that contains the micromirror device. This scattered light typically travels through the projection lens of the display device and is directed on to the target, even when the micromirrors are set for displaying a dark pixel.

Spatial light modulators are key components of such display systems, and may produce significant undesired scattered light. For example, a micromirror-based spatial light modulator comprises an array of reflective and deflectable micromirror devices, which is packaged for protection purposes in handling, delivering, and operation. In operation, incident light of the display system is incident onto the micromirror array, and unavoidably also on the package of the array. Undesired scattered light from the array of micromirrors in the spatial light modulator can be depressed in many ways, as set forth in U.S. patent application Ser. No. 10/305,536, Ser. No. 10/305,536, and Ser. No. 10/305,509 both to Huibers et al. and filed Nov. 26, 2002, the subject matter of each being incorporated herein by reference. Because the package is unavoidably illuminated by the incident light, the package may also produce undesired scattered light that is eventually projected onto the viewing screens, thus resulting in a poor contrast ratio.

Therefore, methods and apparatus for reducing light scattering from a package of a spatial light modulator are needed to improve the display quality.

SUMMARY OF THE INVENTION

In view of the foregoing, the present invention provides a micromirror based spatial light modulator in a package having a light absorbing material for reducing light scattering therein. The objects and advantages of the present invention will be obvious, and in part appear hereafter and are accomplished by the present invention. Such objects of the invention are achieved in the features of the independent claims attached hereto. Preferred embodiments are characterized in the dependent claims.

BRIEF DESCRIPTION OF THE DRAWINGS

The accompanying drawings are illustrative and are not to scale. In addition, some elements are omitted from the drawings to more clearly illustrate the embodiments. While the appended claims set forth the features of the present invention with particularity, the invention, together with its objects and advantages, may be best understood from the following detailed description taken in conjunction with the accompanying drawings, in which:

FIG. 3b demonstratively shows a cross-section view of the device package in FIG. 3a;

DETAILED DESCRIPTION OF THE DRAWINGS

The present invention discloses a MEMS device with in a package having light absorbing or blocking materials for reducing undesired light scattering. The light absorbing material can also be provided for defining the effective area of the incident light for illuminating the reflective surfaces of the micromirrors. Meanwhile, a light reflecting material can be arranged to define the effective area of the reflective light, which can be collected and projected onto viewing screen. Such material can be disposed in an active or inactive area of the device, and in a form of continuous film, strip, segments, frame, or a combination thereof. The material can be disposed in any suitable locations of the package, such as the walls of the package and components within the package. The following description refers to drawings which are based on selected examples for demonstration purposes only and should not be interpreted as a limitation to the present invention. Other variations without departure from the spirit of the present invention may also be applicable. For example, in other MEMS devices operates with light involved, such as LCD systems, LCOS systems, plasmas, the present invention can be implemented to such devices for the purpose of reducing undesired light scattering.

Figure 1:
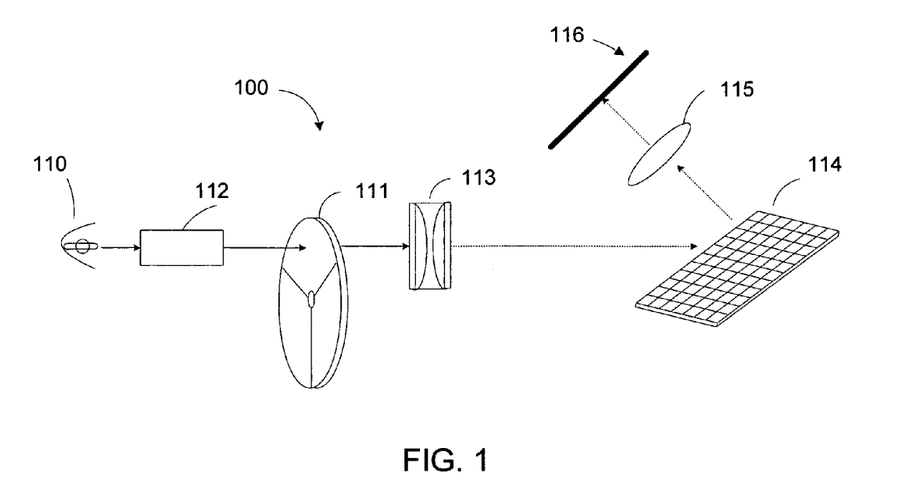
FIG. 1 is a diagram that schematically illustrates an exemplary display system employing a spatial light modulator having an array of micromirrors.

FIG. 1 presents an exemplary display system that employs a spatial light modulator comprising an array of micromirrors. In its basic configuration, display system 100 comprises light source 110, optical devices (e.g. light pipe 112, condensing lens 113 and projection lens 115), display target 116 and spatial light modulator 114 that further comprises a plurality of micromirror devices (e.g. an array of micromirrors). Light source 110 (e.g. an arc lamp) emits illumination light, which then travels through light integrator 112, color wheel 111, and condensing lens 113, and illuminates spatial light modulator 114. Though the color wheel is positioned after the light integrator at the propagation path of the illumination light in this example, the color wheel may be positioned between the light source and light pipe as well. The micromirrors of the spatial light modulator 114 are actuated selectively by a controller (e.g. as disclosed in U.S. Pat. No. 6,388,661 issued May 14, 2002, incorporated herein by reference) so as to reflect—when in their "ON" position—the incident light into projection optics 115, resulting in an image on display target 116 (screen, a viewer's eyes, a photosensitive material, etc.). Generally, more complex optical systems are often used, especially in displaying applications for color images.

Figure 2:
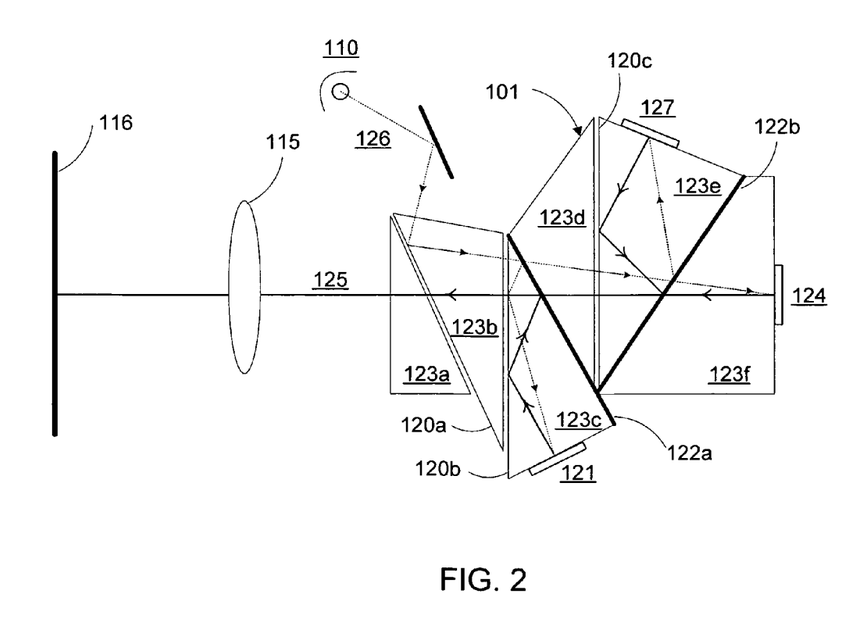
FIG. 2 is a diagram that schematically illustrates another exemplary display system employing three spatial light modulators, each having an array of micromirrors.

Referring to FIG. 2, another exemplary display system employing three spatial light modulators, each comprising an array of micromirrors and being designated for respectively modulating the multi-color (e.g. three color such as red, green and blue) light beams, is presented therein. The display system employs a dichroic prism assembly 101 for splitting incident light into three primary color light beams. Dichroic prism assembly comprises prisms 123a, 123b, 123c, 123d, 123e and 123f. Totally-internally-reflection (TIR) surfaces, i.e. TIR surfaces 120a, 120b and 120c, are defined at the prism surfaces that face air gaps. The surfaces 122a and 122b of prisms 123c and 123e are coated with dichroic films, yielding dichroic surfaces. In particular, dichroic surface 122a reflects green light and transmits other light. Dichroic surface 122b reflects red light and transmits other light. The three spatial light modulators, 121, 124 and 127, each having a micromirror array device, are arranged around the prism assembly.

In operation, incident white light 126 from light source 110 enters into prism 123b and is directed towards TIR surface 120a at an angle larger than the critical TIR angle of TIR surface 120a. TIR surface 120a totally internally reflects the incident white light towards spatial light modulator 124, which is designated for modulating the blue light component of the incident white light. At the dichroic surface 122a, the green light component of the totally internally reflected light from TIR surface 120a is separated therefrom and reflected towards spatial light modulator 121, which is designated for modulating green light. As seen, the separated green light may experience TIR by TIR surface 120b in order to illuminate spatial light modulator 121 at a desired angle. This can be accomplished by arranging the incident angle of the separated green light onto TIR surface 120b larger than the critical TIR angle of TIR surface 120b. The rest of the light components, other than the green light, of the reflected light from the TIR surface 120a pass through dichroic surface 122a and are reflected at dichroic surface 122b. Because dichroic surface 122b is designated for reflecting red light component, the red light component of the incident light onto dichroic surface 122b is thus separated and reflected onto spatial light modulator 127, which is designated for modulating red light. Finally, the blue component of the white incident light (white light 126) reaches spatial light modulator 124 and is modulated thereby. By collaborating operations of the three spatial light modulators, red, green and blue lights can be properly modulated. The modulated red, green and blue lights are recollected and delivered onto display target 116 through optic elements, such as projection lens 115, if necessary.

Figure 3A:
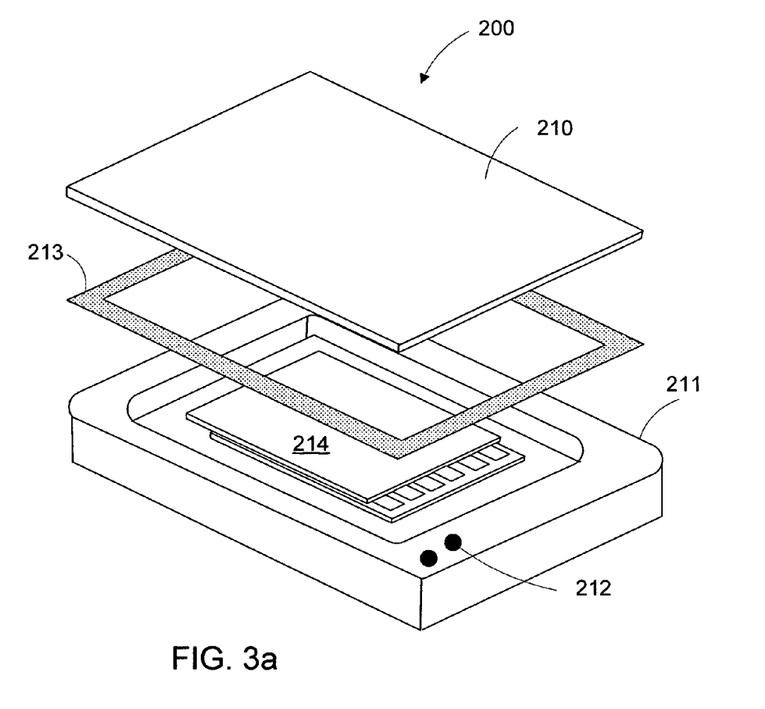
FIG. 3a illustrates a perspective view of an exemplary device package in which embodiments of the invention can be implemented.
Figure 3B:
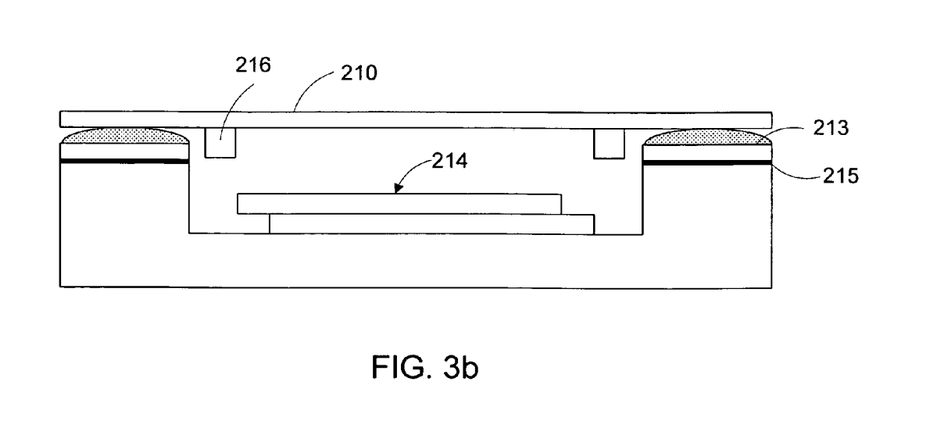

Processes for fabricating a MEMS device such as a movable micro-mirror and mirror array are disclosed in U.S. Pat. Nos. 5,835,256 and 6,046,840 both to Huibers, the subject matter of each being incorporated herein by reference. MEMS devices such as these can be packaged using a package substrate. One example of a package for a SLM is disclosed in U.S. patent application Ser. No. 10/443,318 to Tarn filed May 22, 2003, the subject matter being incorporated herein by reference. An exemplary micromirror array device package is illustrated in FIGS. 3a and 3b. Referring to FIG. 3a, micromirror array device 214 is placed in the cavity of packaging substrate 211 and held by a supporting surface. The pressure within the package is preferably 1 atmosphere or less, such as 700 Torr or less, or 100 Torr or less. In this particular example, the micromirror array device comprises a top glass substrate (e.g. a cross-section view will be illustrated in FIG. 7, wherein top substrate 256 is a glass substrate, while the bottom substrate is a silicon substrate) and a bottom silicon substrate. The top and bottom substrates are bonded together. The bottom substrate is attached to the supporting surface of the packaging substrate. The electric contacting pads are connected to wires, and such wires can be connected to the packaging substrate. Cover substrate 210, which is preferably glass, is provided for sealing the micromirror array device within the cavity. The cover substrate is bonded to the packaging substrate through sealing medium 213, and such bonding may or may not be hermetic. For enabling the bonding performed in a low temperature, such as lower than 180° or less, an integral heater may be embedded in the packaging substrate, which is not shown in the figure. During the bonding process, an electric current can be driven through the integral heater via two heater leads 112 for generating heat. Though cover substrate 110 is preferably visible light transparent glass, it may also be other materials, such as metals or materials that are not transparent to visible light. Alternatively, cover substrate 110 may have an opening forming window with a light transparent glass mounted on the window for allowing transmission of incident light. Moreover, a light blocking mask with light blocking strips formed around the circumference of the mask may be applied along cover substrate 110 for blocking incident light shining on the surface of the micromirror array device. This package is just one example of a package for a MEMS device and should not be taken as limiting the scope of the present invention. One other general description of a standard MEMS package is an opaque ceramic package with a lid bonded to the top, although packages can be comprised of many materials.

FIG. 3b illustrates a cross-section view of the package in FIG. 3a. As can be seen in FIG. 2b, integral heater 215 is formed underneath the surface of the packaging substrate. Micromirror array device 214 is disposed and held by the cavity of the packaging substrate. Cover substrate 210 is bonded to the surface of the packaging substrate through sealing medium 213. Other optional features can also be provided. For example, getter 216 can be provided for removing moistures within the package. In addition, lubricant materials can be provided within the package for lubricating the surfaces, especially the contacting surfaces of the micromirrors of the micromirror array device, which is not shown in the figure.

Packages for MEMS devices, although highly imperative and beneficial, create opportunities for undesired light scattering and diffraction to occur. In operation, incident light from the light source of the projection system illuminates the reflecting surfaces the array of micromirrors in the device package. The micromirrors individually reflect the incident light into different direction by switching between the ON and OFF state according to provided image data. The reflected light carrying image information is collected and projected onto a viewing screen or by direct view. Because the device package is unavoidably exposed to the incident light, undesired light scattering may occur, as demonstrated in FIG. 4, which in turn degrades the image quality.

Figure 4:
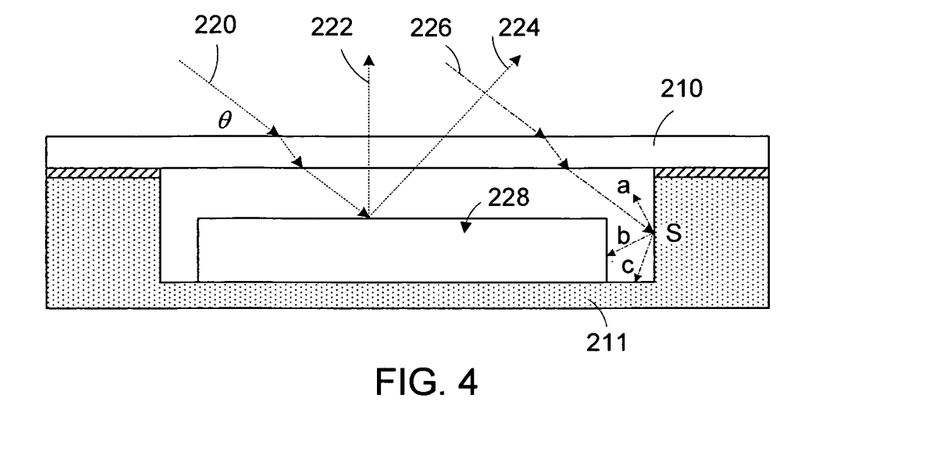
FIG. 4 illustrates a cross-section view of a device in prior art in which undesired light scattering may occur.

Referring to FIG. 4, a typical micromirror-based spatial light modulator package in the art is illustrated therein. Micromirror array device 228 is sealed in a cavity between packaging substrate 211 and cover substrate 210 that is light transmissive to incident light. Incident light beam 220 is directed onto the reflecting surfaces of the micromirrors in spatial light modulator 228, and reflected into reflected light 222 or 224 depending upon the state of the micromirror. Reflected light 222 is collected by the projection lens (e.g. projection lens 115 in FIG. 1 and FIG. 2) and projected to the viewing screen 116 in FIG. 1 or 2 so as to produce a bright pixel. Reflected light 224 is reflected away from the viewing screen, and the corresponding pixel in the viewing screen is thus dark. In view of the contrast ratio, it is certainly advantageous that only the reflected light from the micromirrors in the ON state is allowed to be collected and projected to the viewing screen. However, undesired light scattering from the spatial light modulator and the device package may occur.

Figure 7:
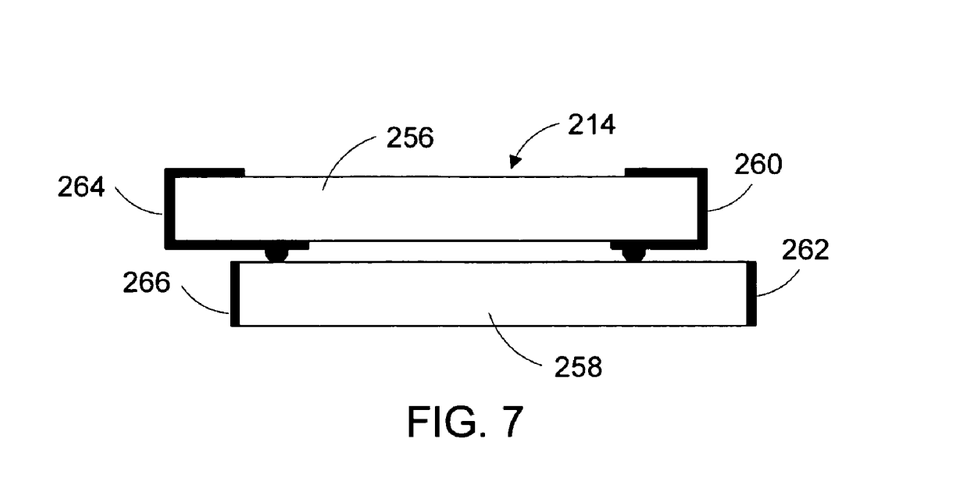
FIG. 7 illustrates a device having multiple substrates one of which is transmissive to visible light, wherein one or both of the substrates have light absorbing materials coated on the edges.
Figure 8:
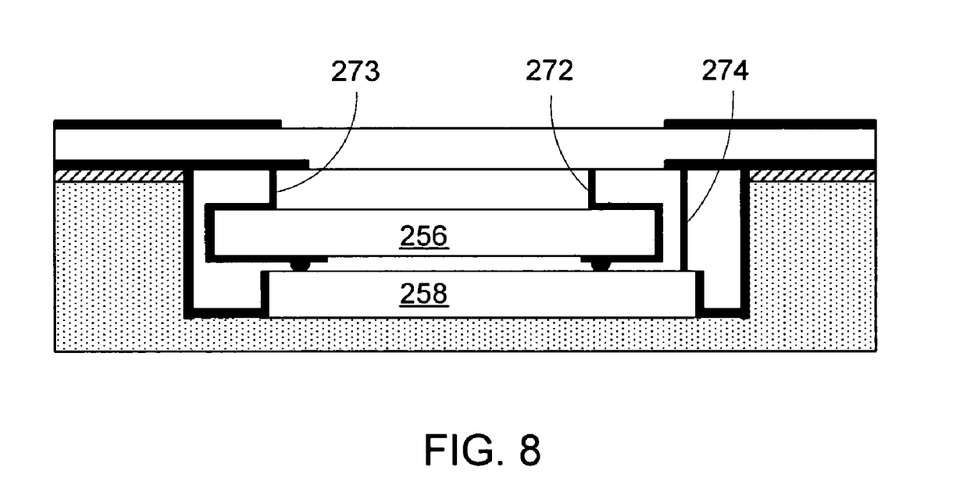
FIG. 8 illustrates a package having the micromirror array device in FIG. 7 according to an embodiment of the invention.

For example, light beam 226 may travel through the cover substrate and hit illuminates the side wall of the package at point S, as shown in the figure. The incident light at point S is scattered into scattered light, such as scattered light a, b, and c along different directions. These scattered light beams are re-directed onto the surface of the package substrate (e.g. light beam c), sides of the spatial light modulator (e.g. light beam b), and towards the cover substrate (e.g. light beam a). These scattered light beams, after reflections, may be collected by the projection lens and projected onto the viewing screen, degrading the contrast ratio. A beam of light first incident onto the spatial light modulator may also result light scattering, especially when the spatial light modulator comprises a light transmissive substrate, an exemplary of which is shown in FIGS. 7 and 8. Referring to FIG. 7, the spatial light modulator comprises substrate 256 on which an array of reflective and deflectable micromirrors are formed. For addressing and deflecting the micromirrors, an array of addressing electrodes is formed on substrate 258 that is positioned proximate to the micromirrors. The incident light may travel through the light transmissive substrate 256 and impinges the side walls of the package substrate in FIG. 4. Moreover, the incident light propagating within the device package and being modulated by the micromirrors may have an opportunity of being scattered by other components of the spatial light modulator, or any components within the device package. All these scattered light may be collected by the projection lens and projected onto the viewing screen, resulting in degradation of the contrast ratio.

Figure 5:
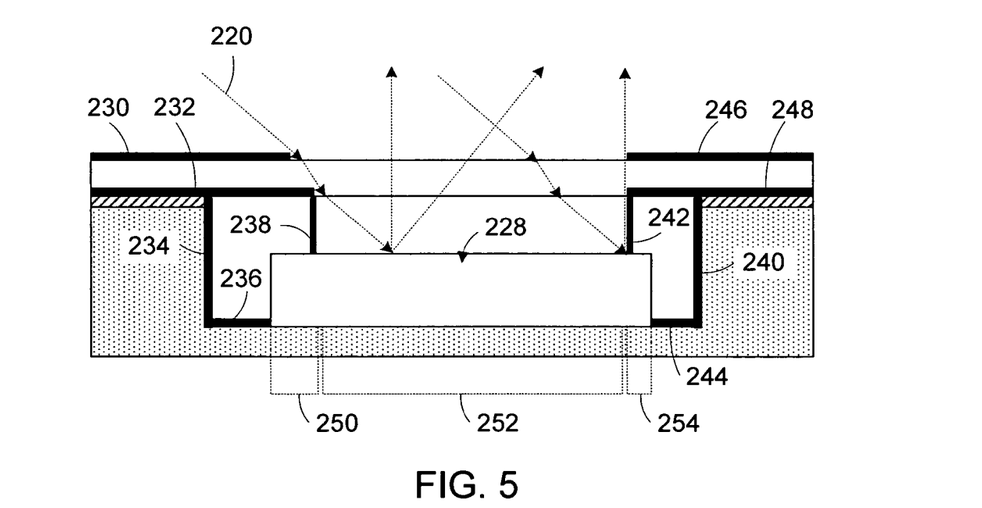
FIG. 5 illustrates a cross-section view of a device package having formed therein a light absorbing material for reducing undesired light scattering.

To reduce the undesired light scattering, a light absorbing material is provided for the device package, as shown in FIG. 5. Referring to FIG. 5, various light-absorbing or light-blocking barricades and walls can be included inside the device package to reduce light scattering. The light absorbing material can be formed in a form of a continuous light blocking film, strips, frames, and segments, and can be disposed at any suitable locations within the device package, or on the exposed (and/or non-exposed) exterior surfaces of the device package. 230, 232, 234, 236, 238, 240, 242, 244, 246, 248 in FIG. 5 and 266 and 268 in FIG. 6, and 260, 262, 264, and 266 in FIG. 7 are examples of such constructions. These objects, as described in more detail below, can be used alone, or in any combination thereof.

The light blocking material can be a single layer or a multilayered structure. In a preferred embodiment of the invention, the light-absorbing material absorbs at least 85% of visible light incident thereon, preferably 90% or more, or 95% or more, or 99% or more. The light absorbing material is preferably one that absorbs wavelengths of broad range in the visible spectrum. An opaque material, preferably a black material, is preferred. More specifically, the non-reflective material can be a dark, opaque (e.g. black, grey, or other dark colors) thin film. In particular, the light absorbing material comprises Chromium or chromium oxide Other suitable materials, such as black nickel, $CrN_x$, $TiAl_x$, $TaN_x$, and materials containing carbon, such as amorphous $CN_x$, amorphous $CAl_xN_y$, $CTi_xN_y$, a-DLC, vitreous carbon, SiC, TiAlCN, WC, etc, are also applicable. Multilayer structures, such as TiC/WC, WC/C or TiAln/WC/C, can be used, as well as other multilayer structures with matched indices. Also, polymides and other polymers containing carbon black (or other opacity increasing material) can be used. If the light absorbing layer is exposed to an etchant at the time of release of the micromirrors, the light absorbing material should preferably be resistant to the etchant used. Of course, other opaque films (preferably those with high optical density, thermally stable and with low reflectivity) can be used.

The light absorbing material can be deposited as a thin film using suitable standard thin film deposition techniques, such as electroplating, PVD, CVD, PECVD, sputtering, and CMP (chemical mechanical polarization). The light absorbing thin film may have a thickness in an order of microns or less, such as 100 microns or less, 50 microns or less, 10 microns or less, or several microns or even less.

As an example of the invention, light absorbing films 230 and 246 can be can be deposited on the top surface (the surface facing the incident light) of the cover substrate. These light absorbing films can be patterned according to the distribution of the active (252) and inactive (250 and 254) areas of micromirrors in the spatial light modulator, as set forth in U.S. patent "Asymmetric Spatial Light modulator" to Huibers, filed on the same day as the present invention. Specifically, the micromirrors in the active area in a display application correspond to the image pixels in the viewing screen, while the micromirrors in the inactive areas do not. The light absorbing films 230 and 246 can be configured to define the light beams of the incident light for illuminating the micromirrors in the active area. Moreover, these light absorbing films can be employed to absorb undesired scattered light produced from the components within the device package and traveling through the segments of the cover substrate coated with these light absorbing films.

Alternatively, the lower surface of the cover substrate of the device package can also be coated with light absorbing films, such as 232 and 248. Similar to the films 230 and 246, films 232 and 248 can be configured to confine the effective illumination light beam onto the micromirrors in the active area while blocking illumination light beams onto the micromirrors in the inactive areas. Furthermore, films 232 and 248 can be employed to absorb undesired scattered light traveling through the portion of the cover substrate coated with films 232 and 248.

For reducing light scattering from the side walls of the device package, light absorbing film 240 and 234 can be deposited on the side walls of the device package. In addition, light absorbing films 244 and 236 can be deposited on the supporting surface of the cavity in the package substrate. In another embodiment, light absorbing films 236 and 244 can be a continuous light absorbing film covering appropriate portion or even the entire supporting surface of the cavity in the device package. In fact, it is preferred that any exposed portion to the illumination light, either directly or indirectly, is coated with a light absorbing film. Of course, depending upon the specific configuration of the incident light, the position of the spatial light modulator within the package, and the structure of the spatial light modulator, the light absorbing films can be patterned into a continuous film or films, or segments of films, strips, frames, or a combination thereof as appropriate, especially, other factors, such as cost-efficiency needs to be included into consideration.

Figure 6:
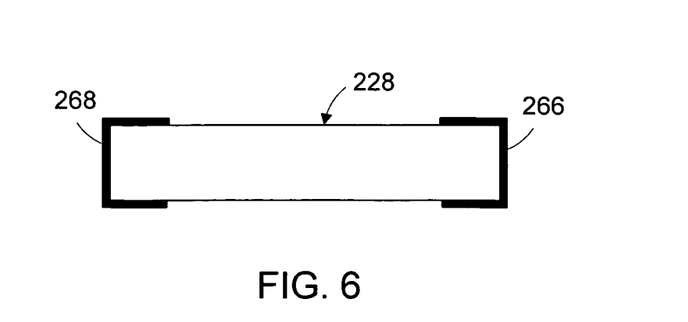
FIG. 6 illustrates the device in the device package with the device having light absorbing materials coated on the edges or side walls.

In addition to the interior surfaces of the device package, edges of the spatial light modulator, as well as the exterior surfaces, especially the exterior surfaces directly exposed to the illumination light can be coated with light absorbing films. Referring to FIG. 6, edges of spatial light modulator 228 is coated with suitable light absorbing layers 266 and 268. The light absorbing layers can be deposited on the edges and the circumference surfaces (the top or the bottom or both) in vicinity of the edges, as shown in the figure. Alternatively, only the edges are coated with the light absorbing films for simplicity purposes.

Figure 9:
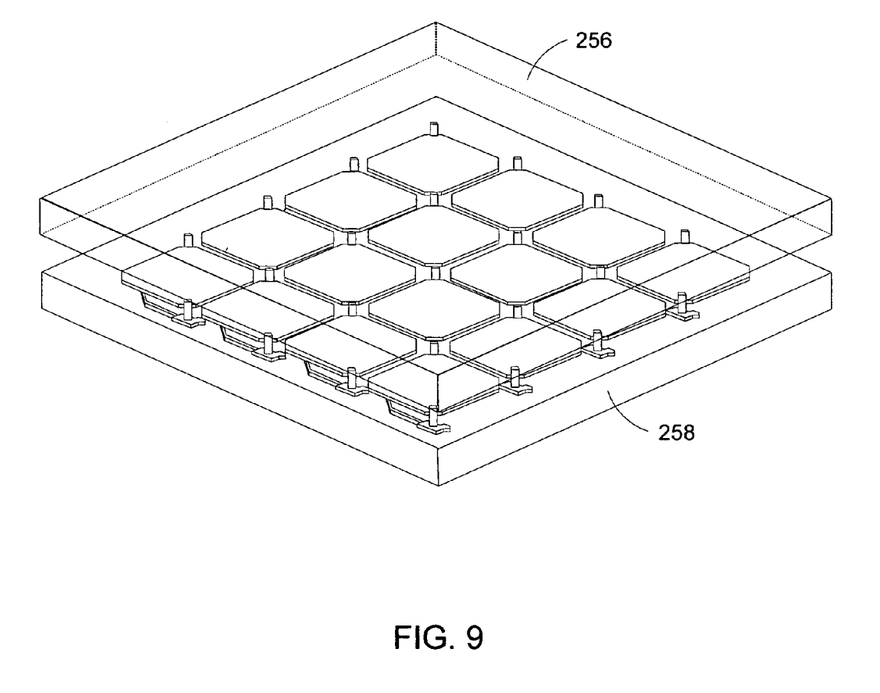
FIG. 9 illustrates a perspective view of an exemplary spatial light modulator of FIG. 7 having an array of micromirror devices.

As a way of example, FIG. 7 illustrates a cross-section view of an exemplary spatial light modulator having two substrates with an array of deflectable and reflective micromirrors and an array of addressing electrodes respectively formed thereon. For reducing undesired scattered light, the edges, as well as the circumference surfaces of substrate 256, which is transmissive to incident light are coated with light absorbing films 264 and 260. Alternatively, the edges of substrate 258, which can be a silicon wafer can also be coated with light absorbing films. Because the two substrates are bonded together with a bonding material, such as a mixture of an adhesive material and beads as shown in the figure, the bonding material may also introduce undesired light scattering. For this reason, the light blocking/absorbing film on the lower surface of the top substrate (256) is preferably extended to cover the bonding material. A perspective view of an exemplary spatial light modulator having a cross-section of FIG. 7 is illustrated in FIG. 9.

Turning again to FIG. 5, in another embodiment of the invention, additional light absorbing walls are placed inside the device package. Walls such as 238 and 242 can be positioned anywhere inside the package in order to reduce scattering light and light diffraction. These light-absorbing walls may serve to keep the desired light inside the active area, as well as to absorb undesired light that is scattered throughout the device. One method of forming said walls can be forming a circular wall on the bottom of the package glass before it is bonded to the package.

In another embodiment of the present invention, vertical walls are placed along the interior side walls of package substrate. For example, walls 234 and 240 as vertical walls are disposed along the interior side walls of the package substrate. This embodiment is not limited to vertical lines however. Horizontal walls or barricades can also be placed on the bottom of the package, further preventing light from reflecting off of the package walls. Additionally, 234 and 240 can also represent light-absorbing coatings placed directly on the inside of the package.

When the spatial light modulator comprises two substrates, especially one of which is transmissive to the incident light, it is advantageous to provide a vertical light absorbing wall for absorbing the light passing through the light transmissive substrate, as shown in FIG. 8. Referring to FIG. 8, vertical light absorbing wall 274 can be provided and is preferably positioned on the lower substrate 258, regardless whether the edges of the upper substrate 256 are coated with light absorbing films, such that the incident light passing through the light transmissive substrate 256 can be absorbed. As an alternative feature, vertical light absorbing walls 272 and 273 can also be provided, and positioned on the opposite ends of the upper substrate 256 as shown in the figure.

It is also possible to put an "anti-reflective coating" (an AR film) on the inside of the package and on the cell glass. For example, a normally absorptive surface can have enhanced absorption if an "AR film" stack (for example light transmissive dielectric layers), are placed above it so that light reflection is reduced due to destructive interference. Such dielectric layers can be designed to work particularly well at certain wavelengths and/or angles—and can be used for walls and coatings inside the MEMS package.

Forming the light absorbing areas can be by any suitable forming method—such as standard deposition and patterning techniques. For example, the metals and metal alloys can be deposited by sputtering a target in an inert atmosphere. Other techniques, such as electroplating can be used. For ceramic materials, a target can be reactively sputtered—such as in a nitrogen atmosphere to form nitride ceramic films. Or, some films can be deposited by chemical vapor deposition as known in the art.

It should be noted that materials and methods mentioned above are examples only, as many other materials and methods could be used. Moreover, in the above, the present invention has been discussed with examples wherein the micromirror array device has two bonded substrates. In fact, the method of the invention can be applied to other type of microstructures and semiconductor devices and their packages. In particular, the method of the invention is applicable to a micromirror array device and its package wherein the micromirror is formed on a semiconductor substrate having formed thereon an electrode and circuitry, which will not be discussed in detail.

It will be appreciated by those skilled in the art that a new and useful MEMS device package and methods of applying the same for packaging micromirror array devices have been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. In particular, the above described light absorbing walls and coatings can be applied to light emitting, modulating, or detecting electronic device. Examples of such devices are CCDs, LEDs, LCDs, LCOSs, and MEMS devices that are formed on silicon substrates.

We claim:

1. A micromirror array device package, comprising:
   a micromirror array device;
   a package substrate having a plurality of interior surfaces together defining a cavity in which the micromirror array device is disposed;
   a cover substrate disposed such that the micromirror array device is capable of being enclosed between the package substrate and cover substrate; and a light blocking material deposited on at least one of the plurality of interior surfaces of the package substrate for reducing scattered light therefrom, wherein the light absorbing material is more absorbing to visible light than said at least one interior surface.

2. The package of claim 1, further comprising a light absorbing wall that is not a portion of the packaging substrate.

3. The package of claim 2, wherein the light absorbing wall is disposed between a top surface of the micromirror array device and a bottom surface of the cover substrate.

4. The package of claim 1, wherein light absorbing material is deposited as a continuous film.

5. The package of claim 1, wherein light absorbing material is deposited as a strip.

6. The package of claim 1, wherein light absorbing material is deposited as a frame.

7. The package of claim 1, wherein light absorbing material is deposited as a segment of a film or a strip or a frame.

8. The package of claim 1, wherein light absorbing material is deposited on a surface of the cover substrate.

9. The package of claim 1, wherein the absorbing material is deposited on an interior side wall of the package substrate.

10. The package of claim 1, wherein the light absorbing material is deposited on a supporting surface of the cavity in the packaging substrate.

11. The package of claim 1, wherein the light absorbing material is deposited on an edge of the micromirror array device.

12. The package of claim 11, wherein the micromirror array device comprises two substrates having an array of reflective and deflectable micromirrors and an array of addressing electrodes.

13. The package of claim 12, wherein one of the two substrates has the micromirrors formed thereon, while the other substrate has the electrodes formed thereon; and wherein the edges of the substrate having the micromirrors are deposited with the light absorbing material.

14. The package of claim 13, wherein the edges of the substrate having the addressing electrodes are deposited with the light absorbing material.

15. The package of claim 1, wherein the micromirror array device comprises an array of micromirrors and an array of electrodes formed on a substrate.

16. The package of claim 1, wherein the light absorbing material comprises a Chromium.

17. The package of claim 1, wherein the light absorbing material comprises a Chromium oxide.

18. The package of claim 1, wherein the light absorbing material comprises an element that is selected from the group comprising: nickel, CrN, TiAlN, TaN, CN, CAlN, and TiCN.

19. The package of claim 1, wherein the light absorbing material comprises an element that is selected from the group comprising: vitreous carbon, SiC, TiAlCN, and WC.

20. The package of claim 1, wherein the light absorbing material is a multilayered structure.

21. The package of claim 20, wherein the light absorbing material comprises: TiWC, WC/C or TiAlN/WC/C.

22. The package of claim 1, wherein the cover substrate is transmissive to visible light.

23. The package of claim 22, wherein the cover substrate has an anti-reflection film formed thereon.

24. The package of claim 1, wherein the light absorbing material is deposited as a thin-film having a thickness in an order of microns.

25. The package of claim 24, wherein the thickness of the light absorbing material is 50 microns or less.

26. The package of claim 1, wherein the light absorbing material is deposited by CVD, PVD, electroplating, or chemical mechanical polarization.

27. The package of claim 1, wherein the cover substrate is directly bonded to the packaging substrate.

28. The package of claim 1, wherein the micromirror array device comprises an array of deflectable and reflective micromirrors, and an array of addressing electrodes.

29. The package of claim 1, wherein the light absorbing material absorbs 85% or more of the visible light incident thereto.

30. The package of claim 1, wherein the light absorbing material absorbs 95% or more of the visible light incident thereto.

31. The package of claim 1, wherein the light absorbing material is black in color.

32. The package of claim 1, wherein the light absorbing material is dark gray or dark blue.

33. The package of claim 1, wherein the package substrate comprises a flat plate and an annular ring bonded to the circumference of the flat plate.

34. The package of claim 1, wherein the micromirror array device comprises a glass substrate and a silicon substrate bonded to the glass substrate, wherein the silicon substrate is attached to a supporting surface of the packaging substrate.

35. The package of claim 34, wherein the silicon substrate comprises a plurality of wires that are bonded to the packaging substrate.

36. The package of claim 1, wherein the light absorbing material is deposited on the top surface of the cavity in the packaging substrate, wherein said top surface is substantially parallel to the cover substrate.

37. A display system, comprising:
a light source;
a spatial light modulator of claim 1;
a plurality of optical elements; and
a viewing screen.

38. A micromirror army device package, comprising:
a micromirror array device that is fully encapsulated within a space between a cover substrate and a packaging substrate bonded to the cover substrate, wherein the micromirror array device is attached to one of the two substrates but not the both; and
a light absorbing material disposed on an interior surface of the packaging substrate for absorbing light scattered within the space, wherein the light absorbing material is more absorbing than the packaging substrate.

39. The package of claim 38, wherein the package substrate comprises a flat plate and an annular ring bonded to the circumference of the flat plate.

40. The package of claim 38, further comprising: a vertical wall insert spaced apart from the interior surfaces for absorbing scattered light.

41. A micromirror array device package, comprising:
a micromirror array device;
a packaging substrate having a plurality of interior surfaces together defining a cavity in which the micromirror device is disposed;
a cover substrate bonded to the packaging substrate such that the micromirror array device is encapsulated within the cavity; and
a vertical wall within the cavity for absorbing scattered light, wherein the vertical wall is more absorbing than the packaging substrate.

42. The package of claim 41, wherein the vertical wall is an insert that is spaced apart from the interior surfaces.

43. The package of claim 41, wherein the vertical wall is deposited on one of the plurality of interior surfaces.

44. The package of claim 41, wherein the vertical wall is deposited on a side wall of the micromirror array device.

45. The package of claim 44, wherein the vertical wall is deposited on a silicon or glass substrate of the micromirror array device.

46. The package of claim 41, wherein the vertical wall is operable to absorb 85% or more of the visible light incident thereto.

47. The package of claim 41, wherein the vertical wall is operable to absorb 95% or more of the visible light incident thereto.

48. The package of claim 41, wherein the vertical wall is black in color.

49. The package of claim 41, wherein the vertical wall is dark gray or dark blue in color.

50. The package of claim 41, wherein the vertical wall comprises chromium.

51. The package of claim 41, wherein the vertical wall comprises chromium oxide.

52. A display system, comprising:
a light source;
a spatial light modulator of claim 41;
a plurality of optical elements; and
a viewing screen.

* * * * *